United States Patent
Cserna et al.

(10) Patent No.: US 9,351,328 B2
(45) Date of Patent: May 24, 2016

(54) METHOD FOR TRANSFERRING A COMMUNICATION SESSION BETWEEN DEVICES

(71) Applicant: Telefonaktiebolaget L M Ericsson (publ), Stockholm (SE)

(72) Inventors: Bence Cserna, Budapest (HU); Attila Mihály, Dunakeszi (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/438,005

(22) PCT Filed: Oct. 25, 2012

(86) PCT No.: PCT/EP2012/071149
§ 371 (c)(1),
(2) Date: Apr. 23, 2015

(87) PCT Pub. No.: WO2014/063739
PCT Pub. Date: May 1, 2014

(65) Prior Publication Data
US 2015/0245398 A1    Aug. 27, 2015

(51) Int. Cl.
*H04B 5/00* (2006.01)
*H04W 76/02* (2009.01)
*H04L 29/08* (2006.01)
*H04L 29/06* (2006.01)
*H04W 4/00* (2009.01)
*H04W 76/04* (2009.01)

(52) U.S. Cl.
CPC ........... *H04W 76/023* (2013.01); *H04L 67/148* (2013.01); *H04L 67/303* (2013.01); *H04L 69/24* (2013.01); *H04W 4/008* (2013.01); *H04W 76/04* (2013.01)

(58) Field of Classification Search
CPC ..... H04L 69/24; H04L 67/148; H04W 4/008; H04W 76/023; H04W 76/04
USPC ........................................................ 455/41.1
See application file for complete search history.

(56) References Cited

U.S. PATENT DOCUMENTS

| | | |
|---|---|---|
| 2007/0094490 A1 | 4/2007 | Lohr |
| 2010/0093346 A1 | 4/2010 | Song et al. |
| 2011/0065383 A1 | 3/2011 | Frankland et al. |
| 2011/0065384 A1 | 3/2011 | Cader et al. |

FOREIGN PATENT DOCUMENTS

| | | |
|---|---|---|
| EP | 2 180 652 A1 | 4/2010 |
| WO | WO 2005/109829 A1 | 11/2005 |
| WO | WO 2011/017007 A1 | 2/2011 |
| WO | WO 2011/141618 A1 | 11/2011 |

OTHER PUBLICATIONS

International Search Report, PCT Application No. PCT/EP2012/071149, Jul. 15, 2013.

*Primary Examiner* — Eugene Yun
(74) *Attorney, Agent, or Firm* — Myers Bigel & Sibley, P.A.

(57) ABSTRACT

A method for transferring a communication session between a source user device and a target user device in a communication network, where the communication session is established between the source user device and a server is proposed. An identifier of a user device is determined. A session modification request is then sent from the source user device to the server, where the request includes the identifier of the target user device. A capability of the target user device to handle the communication session is then checked. Next, if the target user device is capable of handling the communication session a further communication session between the server and the target user device is established.

20 Claims, 3 Drawing Sheets

METHOD FOR TRANSFERRING A COMMUNICATION SESSION BETWEEN DEVICES

CROSS REFERENCE TO RELATED APPLICATION

This application is a 35 U.S.C. §371 national stage application of PCT International Application No. PCT/EP2012/071149, filed on 25 Oct. 2012, the disclosure and content of which is incorporated by reference herein in its entirety. The above-referenced PCT International Application was published in the English language as International Publication No. WO 2014/063739 A1 on 1 May 2014.

TECHNICAL FIELD

The present disclosure generally relates to transferring of an ongoing communication session between two devices. The technique may be implemented as a method, a computer program product, a device or a network system.

BACKGROUND

In today's communication world, users of communication services tend to have multiple devices where they can download and view their content, handle voice and video calls, play games etc. The content itself very often comprises different parallel streams. For example an IMS call, with voice and video running at the same time. In such an exemplary case the user of a device (e.g. a smartphone) where an IMS video call is running may have the wish to transfer this call to another device which may be more appropriate for handling the call, e.g. another smartphone with a bigger screen. That would require that there is a way to transfer the ongoing session without needing to interrupt it and re-establish it from the new device. An inter-connection of the two devices would be necessary. These devices can be wired but in the majority of the cases they are wireless.

There are various ways to inter-connect wireless devices. Different wireless protocols have been standardized like Wi-Fi and Bluetooth. Accordingly there are various solutions on how to achieve inter-connection of these devices. To simplify the task of inter-connecting wireless devices automated connection setup methods have been proposed that are triggered by proximity of such devices. In patent applications WO2011017007 and WO2011141618 such concepts are described. Using such concepts it becomes possible e.g. to transfer a service or an ongoing session between two wireless devices.

US Patent 20110065383 describes a way of how to transfer an online service and related user data from one device or user equipment to another using near field communication. The first device is initiating the communication based on proximity detection of the target device. The near field communication is used to coordinate the transfer of information related to the online service by establishing a wireless communication link between the two entities where they exchange credentials and potentially also transfer the required information.

The problem of the above solutions which are built on device-to-device user plane communication over the wireless link is that it results in high link utilization. Also the load on the central processing unit of the source device (i.e. device where the session is initially established) remains high. That may result in fast battery drain. Also, it is not obvious that content destined to a certain device is optimal for another device. For example, if a smarphone transfers a video session to a television set, the stream originally destined for a low resolution screen would yield insufficient quality on the bigger screen of the television.

All cases discussed before imply an intelligent target device (i.e. a device to which an ongoing session is supposed to be transferred) which is capable to establish a wireless connection towards the source device, authenticate itself and transfer different information in a secure way. This may provide limited applicability and is in many cases unnecessary since the target devices may just simply be simple displays or already having standardized control capabilities towards the communication network (e.g. IMS-capable smartphones).

SUMMARY

In general, there is a need for improving the transfer of sessions from one device to another. This object is achieved by the independent claims. Advantageous embodiments are described in the dependent claims.

According to one embodiment, a method for transferring a communication session between a source user device and a target user device in a communication network, wherein the communication session is established between the source user device and a server is proposed. An identifier of the target user device is determined. Then a session modification request is sent from the source user device to the server. The request comprises the identifier of the target user device. A capability of the target user device to handle the communication session is checked. If the target user device is capable of handling the communication session, a further communication session between the server and the target user device is established.

In another embodiment, a control device for transferring a communication session between a source user device and a target user device in a communication network, wherein the communication session is established between the source user device and the control device is proposed. The device comprises a receiver which is adapted to receive an identifier of the target user device from the source user device and a session modification request from the source user device. The control device further comprises a database containing information on a capability of the target user device to handle the communication session. The control device also comprises a processor adapted to establish a further communication session between the control device and the target user device if said target user device is capable of handling the communication session.

In yet another embodiment, a system for transferring a communication session between a source user device and a target user device in a communication network, wherein the communication session is established between the source user device and a server is proposed. The system comprises a container containing an identifier of the target device. The system further comprises the source user device which is adapted to determine the identifier of the target user device and to send a session modification request to the server, said request comprising the identifier of the target user device. the network server which is adapted to check a capability of the target user device to handle the communication session and to establish a further communication session between the server and the target user device if said target user device is capable of handling the communication session, the system also comprising a database which is adapted to contain information on the capability of the target user device to handle the communication session.

BRIEF DESCRIPTION OF THE DRAWINGS

Further aspects, details and advantages of the invention presented herein will become apparent from the following description of exemplary embodiments in conjunction with the drawings, wherein.

DETAILED DESCRIPTION

In the following description of exemplary embodiments, for purposes of explanation and not limitation, specific details are set forth like specific flowcharts or architectural diagrams in order to provide a thorough understanding of the invention presented herein. It can be apparent to one skilled in the art that the invention may be practised in other embodiments that depart from these specific details.

Moreover, those skilled in the art will appreciate that the services, functions and steps explained herein may be implemented using software functioning in conjunction with a programmed microprocessor, an Application Specific Integrated Circuit (ASIC), a Digital Signal Processor (DSP) or a general purposes computer. It will also be appreciated that while the following embodiments will primarily be described in the context of methods and devices, the technique presented herein may also be embodied in a computer program product as well as in a system comprising a computer processor and a memory coupled to the processor, wherein the memory is encoded with one or more programs that may be adapted to perform the services, functions and steps disclosed herein.

The invention described below is generally directed to transferring a communication session from a source user device to a target user device.

Figure 1:
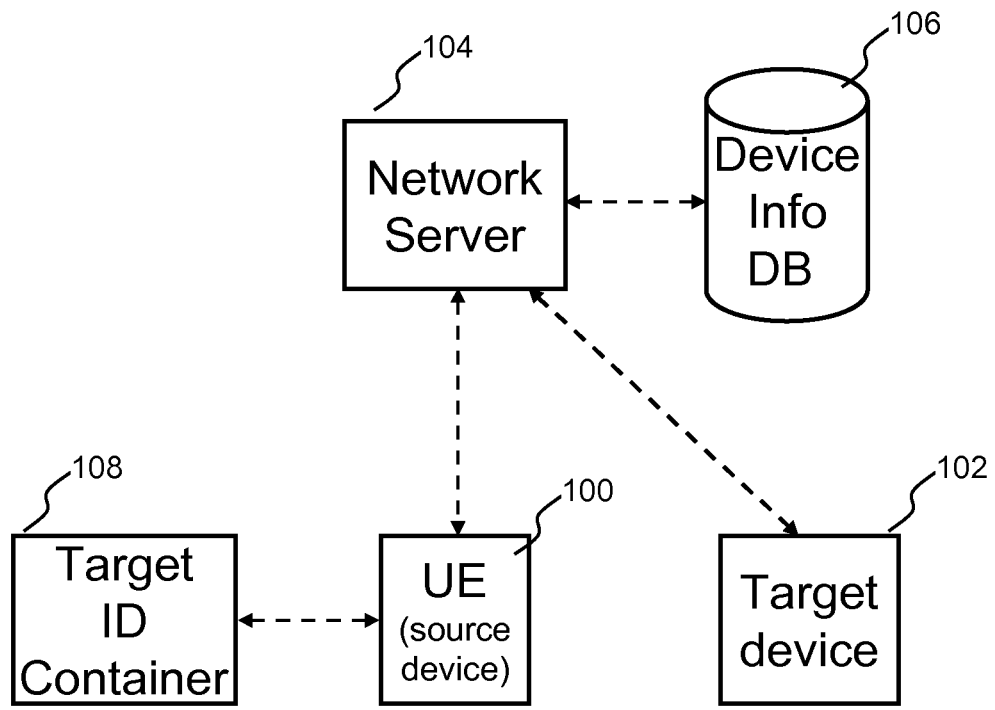
FIG. 1 shows a system for implementing the proposed invention.

FIG. 1 describes the system proposed. The arrows represent control communication between the different entities. The system consists of a source user device (UE) 100 that can trigger a session modification by sending the ID of a target device 102 to a network server 104. The network server 104 can be considered to be a control node as it is the one to control the transferring procedure. The target device is involved into the session after the transfer of this session has been executed.

A Target ID Container 108 forms also part of the system and enables the identification of the target device 102. The ID container 108 may contain a device ID that provides the possibility to uniquely identify a device or a device group at the network side. The ID container 108 may also contain information on the capabilities of a device. These capabilities may be described by the device type/serial number, a list of features of the device or simply a URL that contains a detailed description of the device. Furthermore the ID container may have information on the reachability information of the device like its public IP address or its International Mobile Equipment Identity (IMEI).

An example of a target ID container, from where the target ID may be found, is a barcode which can give information about the device type, manufacturer etc. Another example is a Quick Response (QR) code, i.e. a 2-dimensional barcode, that is capable of encoding high amounts of data and can also provide information on the device type, its capabilities etc. In modern devices reading and interpreting of QR codes using the device's camera and specialized software is a common practice. A further example of a target ID container is a Near Field Communication (NFC) tag which is capable of establishing a two-way or a one-way communication between two endpoints that are approached to very short distance (~4 centimeters). A low-voltage circuit is yet another example of an ID container. A low voltage circuit is a circuit on a device that would transmit data using the capacitive coupling with the human body when it is touched.

The system shown in FIG. 1 comprises also a Network Server (NS) 104 that identifies the user/subscription related to the source UE. The NS may verify the user rights to use a certain target device for a certain service, verify the availability, compatibility and capabilities of the target device (using a Device Information Database) and control the communication sessions and the connection of the target device following the transfer of the communication session.

The system of FIG. 1 finally comprises a Device Information Database 106. This database contains device capability and policy information which determine who, when and how can utilize a given device.

Figure 2:
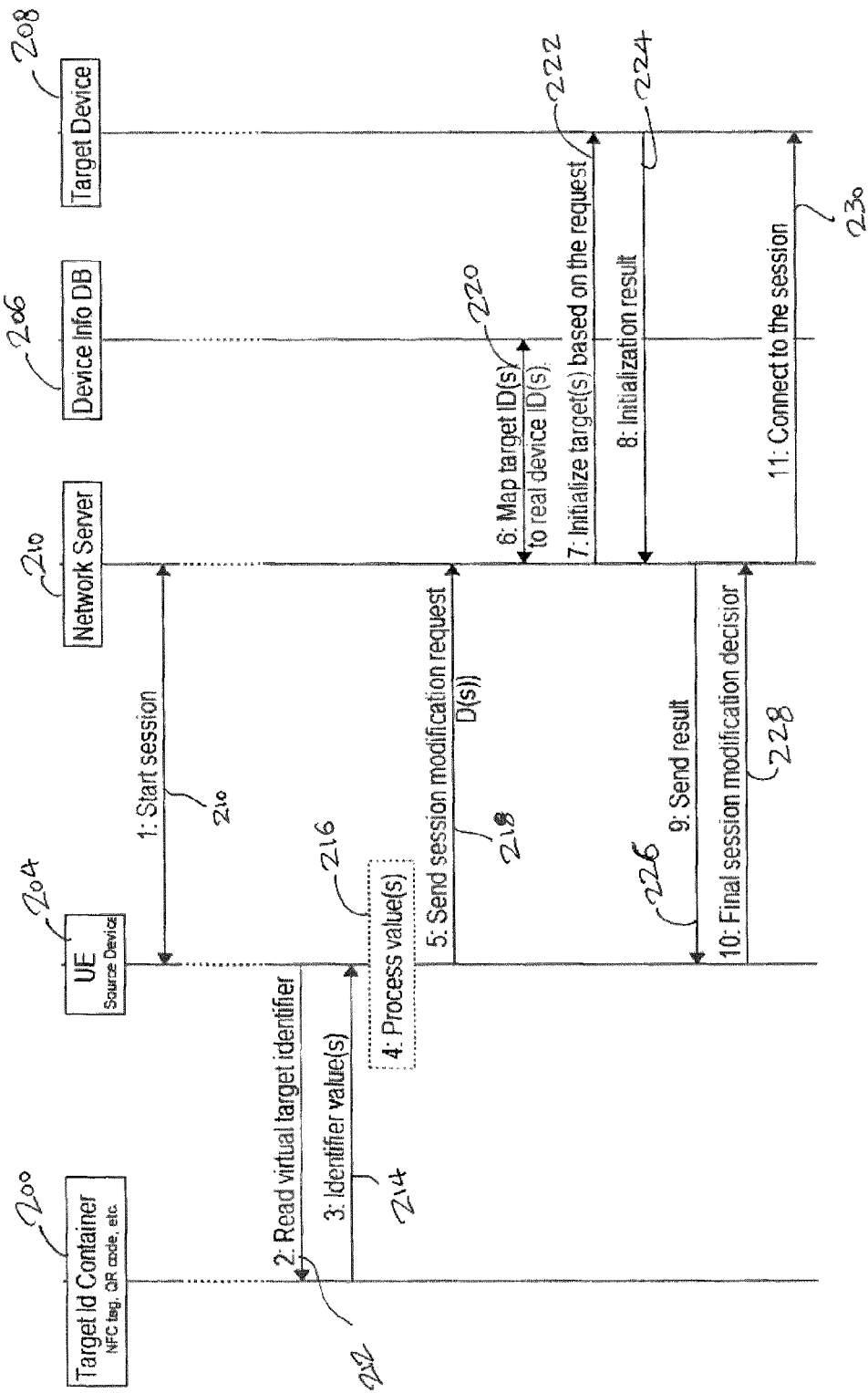
FIG. 2 shows a signalling diagram of the proposed method.

FIG. 2 shows a signalling diagram of the main method for the transfer of a communication session according to the invention. A session 210 is established between the user equipment (UE) 204 which is considered the source device and the Network Server (NS) 210. The NS can be the controlling entity of the session, e.g. a Call Session Control Function (CSCF) for an IMS call. The data plane communication should not necessarily pass over the NS. The UE 204 is approached to a Target ID container 200 to read 212 the identifier of one or more target devices. The identifier uniquely identifies the target device. Information containing the target identifier value(s) is sent 214 to the UE. This information is processed 216 by the UE and a session modification request is sent 218 to the NS 210 together with the target ID. The NS consults the Device Information Database (DID) 206 to map 220 the received target ID(s) to real device ID(s). This may include device reachability information, like for example an IP address of the device or its International Mobile Equipment Identity. Also the DID 206 can provide device capability and policy information to the NS. The capability information can show, among others, if the device can handle high definition video, sound or pictures. The policy information can define which users have what rights to use the device, which service can run on the device etc. If the target device 208 is considered appropriate to fully or partially handle the ongoing session, then the NS 210 tries to initialize 222 the target device 208. The NS receives the initialization result 224 from the target device. The result of the session modification request is sent back 226 to the UE 204. The result depends on the target devices' capability, availability and user policy settings. The user may then take a decision whether to transfer the session or not, based on the initialization result, and sends a final session modification decision 228 back to the NS 204. The NS 204 then connects the selected target device to the session 230. The source device 202 may potentially be disconnected from the session.

The proposed method may be used to forward an ongoing IMS call (e.g., a videoconference call) from a source device (e.g. a mobile Smartphone) to a target device that may be another smartphone that is more appropriate for communication due to having a larger screen or a business phone with a more appropriate subscription fee. The target device may also be a video-conference facility. For example, a user who initiated a video-conference session on his smartphone would approach a room where there is a video conference facility installed. By tapping the QR code on the room's door the user could transfer this session to the devices present in the room.

The method can also be used for a re-selection of an Input/Output (I/O) device. In this case one or more of the UE's own I/O devices would be replaced by some other devices. In this case scenario the session itself and its control are performed at the source device. For example, during the on-going video-conference example described above, the user would only transfer the video stream to a large resolution TV screen, but continue to listen to its Smartphone's loudspeaker (e.g. for privacy reasons or due to lack of audio support in the room).

In another case, a user might be playing an online game on his UE. Approaching a game controller he could re-direct the game controls to this controller and the video stream to his TV set.

In yet another case, a user may be watching video clips from an internet portal on his smartphone. Tapping his UE to a close-by terminal he can redirect the video stream to that terminal. In that case, the UE will no longer process any data related to the given video.

The last two use cases described above may be conceived as Over The Top (OTT) service use cases. That means that the Network Server is not in the control of the service itself. In this case the Target device ID should contain device reachability information, e.g. a public IP address and potentially also device capability information. The initialization of the target device takes place either manually (by the user) or using existing protocols for automated wake-up, like the Wake On Lan (WOL) protocol, UPnP developed by DLNA or other. The connection to the session implies some traffic being re-directed from the Network Server to the target device and potentially also some request to a $3^{rd}$ party server or portal (e.g. a YouTube video request with a certain quality level from a certain play-out timestamp).

It should be noted that the target device may be a public terminal. For example, it may be conceived that the user redirects a video to a large screen available at a train station. The terminal may simultaneously transmit different video sessions, separated e.g. by time division and viewed using specific glasses.

In the case that there is a pre-configured user profile available to the Network Server, when a proximity-based trigger comes from the user equipment, the Network server authenticates the user based on the UE and may start a session or a service on the devices that are sent in the trigger message. An example of such a case may be connecting to a video-conference. The user can tap with his UE the Target ID container (e.g. a QR tag in a meeting room). The server identifies the user, consults the user profile, realizes that the user is supposed to attend a video-conference at that time and it initiates the connection of the video-conference facility to the given video-conference.

There is a lot of discussion nowadays about the concept of Intelligent Home. This concept enables the automation of many functions in a house. In such an Intelligent Home scenario, when reaching home a user might approach his phone to the alarm system controller and by sending this information to the Network Server a series of actions may take place, like for example, switching off the alarm system, unlocking the door, switching the lights on, etc.

Figure 3:
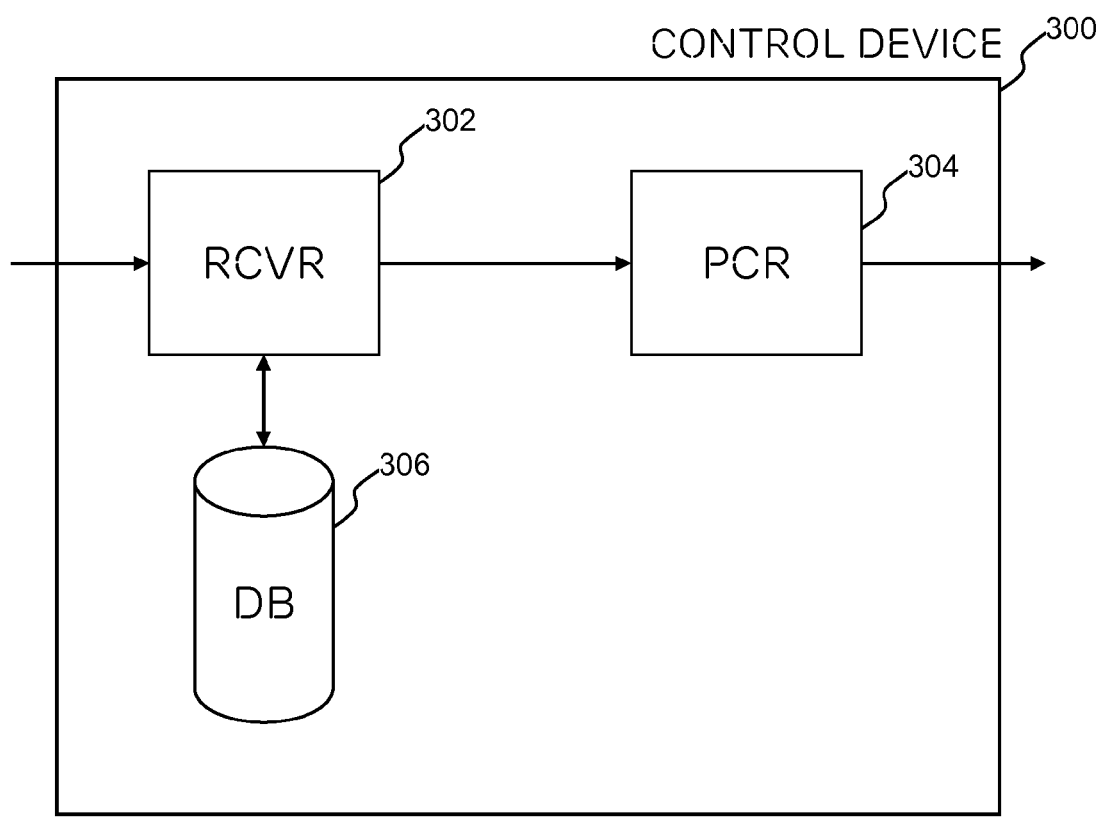
FIG. 3 shows a device implementing the proposed method.

FIG. 3 shows a control device which is adapted to implement the proposed invention. The device can be part of a communication network and control the transferring of a session from the source UE (or device) to the target UE (or device). It can be considered that the session is first established between the source UE and the control device. The device comprises a receiver which is adapted to receive an identifier of the target user device from the source user device and a session modification request from the source user device. The device further comprises a database which contains information on the capabilities of the target user device to handle the communication session which is supposed to be transferred to it. The control device also comprises a processor which is adapted to establish a communication session between the control device and the target user device if the target user device is found to be capable of handling the communication session.

The building blocks of the control device as presented above do not necessarily need to be implemented together in one entity. They can alternatively be implemented in separate entities of a communications network. For example the database can be a separate entity or be part of a bigger data center.

It is believed that many advantages of the invention described are fully understood from the provided description. It will be apparent though that various changes may be made in the form, construction, and arrangement of the exemplary embodiments without departing from the scope of the invention, or without sacrificing all of its advantages. Because the invention presented can be varied in many ways, it will be recognized that the invention should be limited only by the scope of the claims that follow.

The invention claimed:

1. A method for transferring a communication session between a source user device and a target user device in a communication network, wherein the communication session is established between the source user device and a server, the method comprising the steps of:
   determining an identifier of the target user device, wherein determining the identifier comprises reading a barcode, a low-voltage circuit, a Near Field Communication (NFC) device, or an NFC tag;
   sending a session modification request from the source user device to the server, said request comprising the identifier of the target user device, wherein determining the identifier comprises determining the identifier of the target user device before sending the session modification request, and wherein sending the session modification request comprises sending the session modification request comprising the identifier of the target user device from the source user device to the server, in response to reading the barcode, the low-voltage circuit, the NFC device, or the NFC tag;
   checking a capability of the target user device to handle the communication session; and
   establishing a further communication session between the server and the target user device responsive to said target user device being capable of handling the communication session.

2. The method of claim 1, wherein the communication session comprises one of a videoconference call, an online game or a video clip.

3. The method of claim 1, wherein determining the identifier comprises reading the barcode.

4. The method of claim 3, wherein reading the barcode comprises reading a two-dimensional code.

5. The method of claim 4, wherein reading the two-dimensional code comprises reading a Quick Response (QR) code.

6. The method of claim 1, wherein determining the identifier comprises reading the NFC device or the NFC tag.

7. The method of claim 1, wherein the capability of the target user device to handle the communication session is defined by a device type or serial number.

8. The method of claim 1, wherein the capability of the target user device to handle the communication session is defined by a list of features of the device.

9. The method of claim 1, wherein the further communication session is the session established between the source user device and the server.

10. The method of claim 1, wherein the step of determining comprises the source user device approaching the target user device for reading said identifier.

11. The method of claim 1, wherein the step of checking comprises the server contacting a device information database and retrieving from said database a device capability and policy information.

12. A computer program product comprising a non-transitory computer readable medium storing computer-executable instructions that when executed by a processor cause the processor to perform the method of claim 1.

13. The method of claim 1, wherein establishing the further communication session between the server and the target user device comprises transferring the communication session from the source user device to target user device.

14. The method of claim 13, wherein:
the communication session comprises an ongoing videoconference call; and
transferring comprises transferring the ongoing videoconference call from the source user device to the target user device responsive to said target user device comprising a larger screen than the source user device.

15. The method of claim 1, wherein reading the low-voltage circuit comprises reading a circuit on a device configured to transmit data using capacitive coupling.

16. A control device for transferring a communication session between a source user device and a target user device in a communication network, wherein the communication session is established between the source user device and the control device, the control device comprising:
a receiver adapted to receive an identifier of the target user device from the source user device and a session modification request comprising the identifier from the source user device,
wherein the identifier comprises a barcode, a low-voltage circuit, a Near Field Communication (NFC) device, or an NFC tag that is read by the source user device before sending the session modification request in response to reading the barcode, the low-voltage circuit, the NFC device, or the NFC tag;
a database containing information on a capability of the target user device to handle the communication session, and
a processor adapted to establish a further communication session between the control device and the target user device responsive to said target user device being capable of handling the communication session.

17. The control device of claim 16, wherein the database is in the communication network.

18. The control device of claim 16, wherein the capability of the target user device to handle the communication session is defined by a list of features of the device.

19. A system for transferring a communication session between a source user device and a target user device in a communication network, wherein the communication session is established between the source user device and a server, the system comprising:
a container containing an identifier of the target device;
the source user device, wherein the source user device is adapted to determine the identifier of the target user device and to send a session modification request to the server, said request comprising the identifier of the target user device,
wherein determining the identifier comprises reading a barcode, a low-voltage circuit, a Near Field Communication (NFC) device, or an NFC tag,
wherein determining the identifier comprises determining the identifier of the target user device before sending the session modification request, and
wherein sending the session modification request comprises sending the session modification request comprising the identifier of the target user device from the source user device to the server, in response to reading the barcode, the low-voltage circuit, the NFC device, or the NFC tag;
the server, wherein the server is adapted to check a capability of the target user device to handle the communication session and to establish a further communication session between the server and the target user device responsive to said target user device being capable of handling the communication session; and
a database that is adapted to contain information on the capability of the target user device to handle the communication session.

20. The system of claim 19, wherein the capability of the target user device to handle the communication session is defined by a device type or serial number.

* * * * *